US011068905B2

(12) United States Patent
Poteat, III et al.

(10) Patent No.: US 11,068,905 B2
(45) Date of Patent: Jul. 20, 2021

(54) BEHAVIOR ADJUSTMENT BASED ON CAPABILITIES OF A DOWNSTREAM SERVER

(71) Applicant: Red Hat, Inc., Raleigh, NC (US)

(72) Inventors: William Otto Poteat, III, Raleigh, NC (US); Devan Goodwin, Bedford (CA)

(73) Assignee: Red Hat, Inc., Raleigh, CA (US)

( * ) Notice: Subject to any disclaimer, the term of this patent is extended or adjusted under 35 U.S.C. 154(b) by 1130 days.

(21) Appl. No.: 14/268,670

(22) Filed: May 2, 2014

(65) Prior Publication Data

US 2015/0278825 A1 Oct. 1, 2015

Related U.S. Application Data

(60) Provisional application No. 61/973,089, filed on Mar. 31, 2014.

(51) Int. Cl.
*G06Q 30/00* (2012.01)

(52) U.S. Cl.
CPC ....... *G06Q 30/018* (2013.01); *G06Q 2220/18* (2013.01)

(58) Field of Classification Search
None
See application file for complete search history.

(56) References Cited

U.S. PATENT DOCUMENTS

| 5,535,383 | A * | 7/1996 | Gower | G06F 16/289 |
| 7,080,371 | B1 * | 7/2006 | Arnaiz | G06F 8/65 717/168 |
| 7,774,826 | B1 * | 8/2010 | Romanek | H04L 41/00 726/3 |
| 8,024,225 | B1 * | 9/2011 | Sirota | G06Q 30/06 705/26.1 |
| 8,683,579 | B2 | 3/2014 | Zhang | |
| 2002/0107809 | A1 * | 8/2002 | Biddle | G06F 21/105 705/59 |
| 2003/0182414 | A1 * | 9/2003 | O'Neill | G06F 8/65 709/223 |
| 2006/0223503 | A1 * | 10/2006 | Muhonen | G06F 8/61 455/414.1 |
| 2007/0207775 | A1 * | 9/2007 | Denenberg | H04W 8/18 455/406 |

(Continued)

*Primary Examiner* — Neha Patel
*Assistant Examiner* — Gabriel Mercado
(74) *Attorney, Agent, or Firm* — Haynes and Boone, LLP

(57) ABSTRACT

Systems, methods, and techniques are disclosed for controlling access to a subscription. An example method includes receiving a set of capabilities of a downstream server and storing the set of capabilities in a distributor record. The distributor record is a representation of the downstream server and includes the set of capabilities and a set of subscriptions assigned to the distributor record. The method also includes receiving a request to assign a subscription to the distributor record. The subscription is subject to a licensing agreement. The method further includes determining, based on the set of capabilities, whether the downstream server has the capability to enforce the licensing agreement. The method also includes when the downstream server is determined to have the capability to enforce the licensing agreement, assigning the subscription to the distributor record.

17 Claims, 5 Drawing Sheets

(56) References Cited

U.S. PATENT DOCUMENTS

| | | | | |
|---|---|---|---|---|
| 2008/0281965 A1* | 11/2008 | Zhong | H04L 67/24 | 709/224 |
| 2009/0044100 A1* | 2/2009 | Sharp | G06F 3/065 | 715/234 |
| 2011/0093929 A1* | 4/2011 | Li | H04L 47/10 | 726/4 |
| 2011/0307885 A1* | 12/2011 | Cushion | G06F 21/105 | 718/1 |
| 2012/0123917 A1* | 5/2012 | Koutsoyannopoulos | G06Q 40/12 | 705/30 |
| 2012/0158413 A1* | 6/2012 | Goodwin | G06F 21/10 | 705/1.1 |
| 2012/0167229 A1* | 6/2012 | Lao | G11B 20/0021 | 726/26 |
| 2012/0331114 A1* | 12/2012 | Garg | G06Q 10/00 | 709/220 |
| 2014/0006502 A1* | 1/2014 | Gandhi | G06F 9/52 | 709/204 |
| 2014/0089182 A1 | 3/2014 | Short | | |

* cited by examiner

BEHAVIOR ADJUSTMENT BASED ON CAPABILITIES OF A DOWNSTREAM SERVER

CROSS-REFERENCED APPLICATIONS

This application claims the benefit of priority from U.S. Provisional Patent Application No. 61/973,089, filed Mar. 31, 2014, which is incorporated by reference.

FIELD OF DISCLOSURE

The present disclosure generally relates to a computing device, and more specifically to capabilities of a downstream server.

BACKGROUND

A customer may subscribe to a product offered by a company. The subscription may be a paid subscription or a free subscription. The subscription entitles the customer to use the product as long as the subscription is active. In an example, the company provides a software product that is available to and downloaded by the customer. In some examples, the subscription may be subject to a licensing agreement.

BRIEF SUMMARY

It may be desirable to ensure that a computing device that manages a subscription subject to a licensing agreement is capable of enforcing the licensing agreement. Methods, systems, and techniques to control access to a subscription are provided.

According to an embodiment, a method of controlling access to a subscription includes receiving a set of capabilities of a downstream server. The method also includes storing the set of capabilities in a distributor record. The distributor record is a representation of the downstream server and includes the set of capabilities and a set of subscriptions assigned to the distributor record. The method further includes receiving a request to assign a subscription to the distributor record. The subscription is subject to a licensing agreement. The method also includes determining, based on the set of capabilities, whether the downstream server has the capability to enforce the licensing agreement. The method further includes when the downstream server is determined to have the capability to enforce the licensing agreement, assigning the subscription to the distributor record.

According to another embodiment, a system for controlling access to a subscription includes a capabilities tracker that receives a set of capabilities of a downstream server and stores the set of capabilities in a distributor record. The distributor record is a representation of the downstream server and includes the set of capabilities and a set of subscriptions assigned to the distributor record. The system also includes a license enforcer that receives a request to assign a subscription to the distributor record and determines, based on the set of capabilities, whether the downstream server has the capability to enforce a licensing agreement. The subscription is subject to the licensing agreement. When the downstream server is determined to have the capability to enforce the licensing agreement, the license enforcer assigns the subscription to the distributor record.

According to another embodiment, a non-transitory machine-readable medium includes a plurality of machine-readable instructions that when executed by one or more processors are adapted to cause the one or more processors to perform a method including: receiving a set of capabilities of a downstream server; storing the set of capabilities in a distributor record, the distributor record being a representation of the downstream server and including the set of capabilities and a set of subscriptions assigned to the distributor record; receiving a request to assign a subscription to the distributor record, the subscription being subject to a licensing agreement; determining, based on the set of capabilities, whether the downstream server has the capability to enforce the licensing agreement; and when the downstream server is determined to have the capability to enforce the licensing agreement, assigning the subscription to the distributor record.

Unless specifically stated otherwise, as apparent from the following discussion, it is appreciated that throughout the description, discussions utilizing terms such as "receiving", "storing", "sending", "determining", and "assigning", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows.

DETAILED DESCRIPTION

I. Example System Architecture of Downstream Server Not Connected to a Public Network
   A. Capabilities of the Downstream Server
   B. Capability of the Downstream Server to Enforce Licensing Agreement
   C. Update Capabilities of the Downstream Server
II. Example System Architecture of Downstream Server Connected to a Public Network III. Example Method
IV. Example Computing System It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Figure 1:
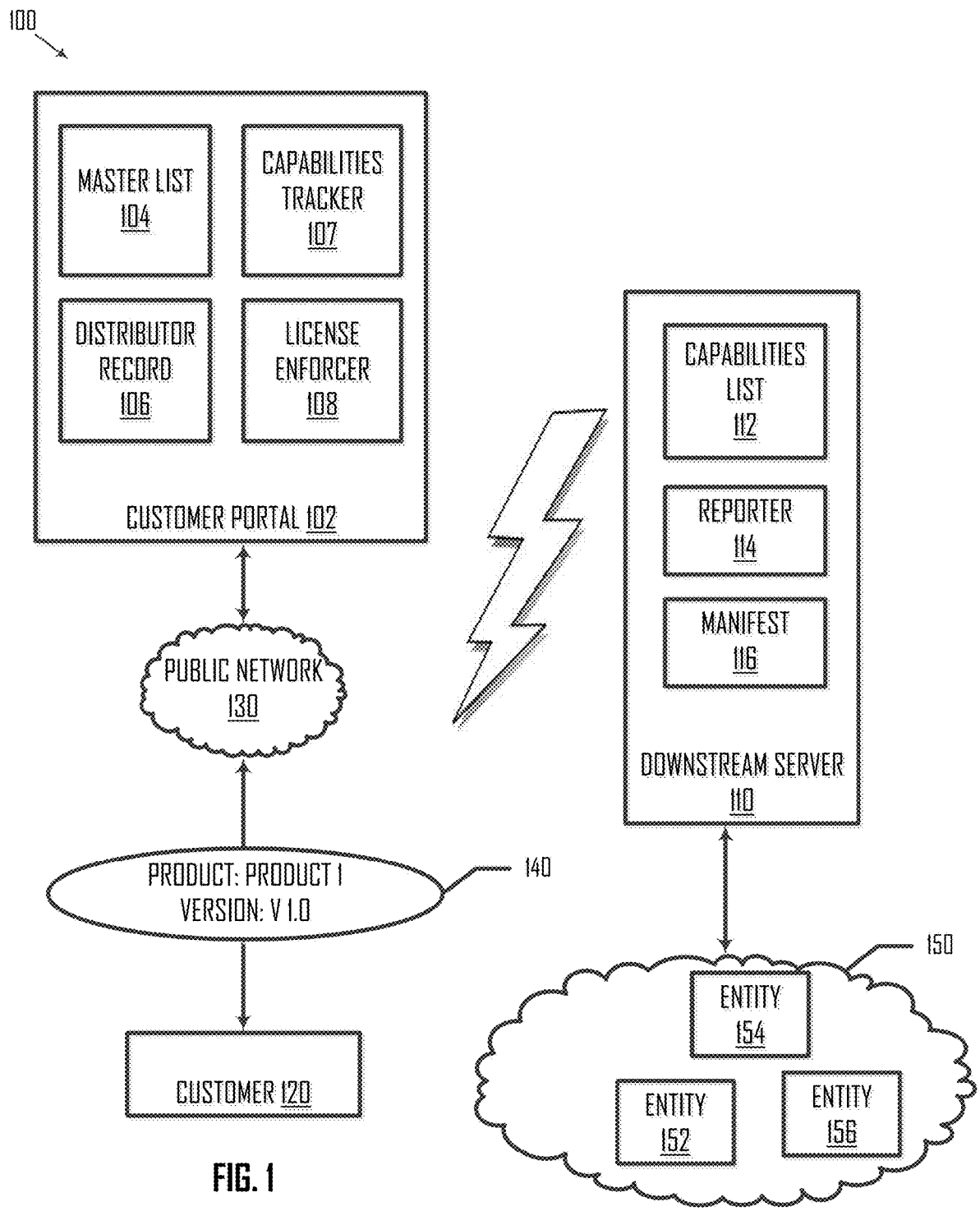
FIG. 1 is a block diagram illustrating a system for controlling access to a subscription, according to an embodiment.

I. Example System Architecture of Downstream Server Not Connected to a Public Network FIG. 1 is a block diagram 100 illustrating a system for controlling access to a subscription, according to an embodiment. FIG. 1 includes a customer portal 102, downstream server 110, and customer 120. In the example illustrated in FIG. 1, customer portal 102 and user 120 is coupled to a public network 130, and downstream server 110 is not coupled to public network 130. Public network 130 may include various configurations and use various protocols including the Internet, World Wide Web, wide area networks, using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

A. Capabilities of the Downstream Server

Customer portal 102 may be referred to as an upstream server and provides access to products to which customers may subscribe. Customer portal 102 includes a master list 104 including a list of downstream server products and/or versions and the capabilities of each downstream server product and/or version listed in the master list. Master list 104 may be stored at customer portal 102 or a database that is accessible to customer portal 102.

A company may offer a subscription to a product (e.g., software application). Customer 120 may desire to subscribe to the product and may do so via customer portal 102. In an example, downstream server 110 is a subscription server. Customer 120 may manage subscriptions via customer portal 102 and downstream server 110. Downstream server 110 may be under the control and management of the customer and may be the server that customer 120 uses to manage its subscriptions. Customer 120 may purchase a number of subscriptions and assign one or more of those subscriptions to downstream server 110 to manage. A set of entities 150 in customer 120's environment may register with downstream server 110 and consume one or more subscriptions managed by downstream server 110. A set of registered entities includes entities 152, 154, and 156, and each of registered entities 152, 154, and 156 may be a virtual or physical machine.

Downstream server 110 may be run in a secure environment and the customer may not want downstream server 110 to be coupled to public network 130. In an example, customer portal 102 is a server-side component that runs in a hosted infrastructure that is maintained and managed by the company. Customer portal 102 may support management of subscriptions in the hosted customer portal. Customer portal 102 may be unable to send messages to downstream server 110. Additionally, downstream server 110 may be unable to send requests to customer portal 102. Customer 120 may subscribe to a product that is sold and shipped to customer 120. Customer 120 may install the product "downstream" in downstream server 110. For an entity of set of registered entities 150, downstream server 110 identifies the entity's one or more product subscriptions and provides the entity with access to the subscribed-to product so that the entity can consume the product. If a subscription is subject to a licensing agreement, downstream server 110 ensures that the particular entity complies with the licensing agreement. Although the term licensing agreement is used, it should be understood that a licensing agreement generally refers to any restriction that is imposed on the subscription.

Customer 120 connects to customer portal 102 via network 130 and creates a distributor record 106 that is stored at customer portal 102 or stored at a database that is accessible to customer portal 102. In an example, customer 120 manually creates distributor record 106 via customer portal 102. Distributor record 106 is a representation of downstream server 110. In an example, distributor record 106 is a record of downstream server 110 and includes the version and product type of downstream server 110, the set of capabilities of downstream server 110, and a set of subscriptions assigned to distributor record 106 (e.g., assigned to downstream server 110). When customer 120 creates distributor record 106, customer 120 may specify data 140 regarding downstream server 110. Data 140 includes the product and version of the server that customer 120 is using to manage its subscriptions. In the example illustrated in FIG. 1 of data 140, which corresponds to downstream server 110, customer 120 specifies that downstream server 110 is a version "V 1.0" of the server product "Product 1".

Customer portal 102 includes a capabilities tracker 107 that searches master list 104 for the product and version of downstream server 110 specified by customer 120 in data 140. Capabilities tracker 107 identifies the set of capabilities of the product and version of the downstream server specified in data 140 and in master list 104. Capabilities tracker 107 receives the set of capabilities of downstream server 110 by, for example, identifying the set of capabilities of downstream server 110 in master list 104.

Table A provides an example of master list 104, which includes a list of downstream server products and versions and also includes the set of one or more capabilities of each listed downstream server product and version included in the master list. The set of capabilities specify one or more capabilities that the corresponding downstream server is capable of handling.

TABLE A

| Server Product | Server Version | Capabilities |
| --- | --- | --- |
| Product 1 | V 1.0 | A, B, C |
| Product 1 | V 2.0 | A, B, C, D |
| Product 2 | V 1.5 | B |

Downstream server 110 corresponds to the first row in the example master list in Table A, which specifies version "V 1.0" of the server product "Product 1" having the capabilities of A, B, and C. The version and server product specified in the first row matches the version and server product specified in data 140. The set of capabilities A, B, and C in row one of Table A may be used as an initial set of capabilities of downstream server 110. The second row of Table A specifies version "V 2.0" of the server product "Product 1" having the capabilities of A, B, C, and D. The third row of Table A specifies version "V 1.5" of the server product "Product 2" having the capability of B.

In an example, if a downstream server has capability "A", the downstream server has the capability of enforcing a number of central processing unit (CPU) cores that an entity registered with the downstream server uses. The subscription may limit the number of CPU cores that any particular entity consuming the subscription uses. If the downstream server does not have this capability of enforcing the number of CPU cores in this way and the subscription is subject to a licensing agreement in which customer 120 agrees that each of its registered entities that consumes this subscription will abide by the number of CPU cores, license enforcer 108 may determine that downstream server 110 does not have the capability of enforcing this licensing agreement.

In another example, if the downstream server has capability "B", the downstream server has the capability of enforcing a limitation on the amount of random access memory (RAM) that an entity registered with the downstream server uses. The subscription may limit the amount of RAM that any particular entity consuming the subscription uses. If the downstream server does not have this capability of enforcing the RAM limitation in this way and the subscription is subject to a licensing agreement in which customer 120 agrees that each of its registered entities that consumes this subscription will abide by the RAM limitation, license enforcer 108 may determine that downstream server 110 does not have the capability of enforcing this licensing agreement.

Data 140 specifies the version and server product of downstream server 110. In an example, capabilities tracker 107 identifies the first row in Table A as corresponding to downstream server 110, identifies the set of capabilities of downstream server 110 in the first row, and stores the set of capabilities of downstream server 110 in distributor record 106. Distributor record 106 is a representation of downstream server 110. In such an example, distributor record 106 is a record of downstream server 110 and includes the version and server product of downstream server 110, the set of capabilities of downstream server 110, and a set of subscriptions assigned to distributor record 106 along with any licensing agreements to which a subscription is subject. The set of subscriptions assigned to distributor record 106 may also be referred to as the set of subscriptions assigned to downstream server 110.

Table B provides an example of distributor record 106.

TABLE B

| Server Product | Server Version | Subscription and Licensing Agreement | Capabilities |
|---|---|---|---|
| Product 1 | 1.0 | S1 subject to A and B | A, B, and C |

Downstream server 110 includes a capabilities list 112, manifest 116, and reporter 114. Capabilities list 112 includes the current capabilities of downstream server 110. Customer 120 may alter capabilities list 112. In an example, the capabilities of downstream server 110 are hardcoded into capabilities list 112. In another example, the capabilities of downstream server 110 are not hardcoded into capabilities list 112. Manifest 116 is a replica or near replica of master list 104 and includes a list of downstream server versions and server products and the capabilities of each of the listed downstream servers. Customer 120 may export master list 104 from customer portal 102 and import master list 104 as manifest 116 to downstream server 110. Reporter 114 is explained in more detail below.

B. Capability of the Downstream Server to Enforce Licensing Agreement

Customer 120 may assign a set of one or more subscriptions to distributor record 106. An assignment of a subscription to distributor record 106 corresponds to an assignment of the subscription to downstream server 110. When customer 120 assigns a subscription to distributor record 106, downstream server 110 may then manage the subscription and provide set of registered entities 150 access to the subscribed-to product. Customer 120 may start using the subscription for set of registered entities 150, and downstream server 110 ensures that each of the registered entities complies with any licensing agreements to which the subscription is subject. Customer 120 may also transfer one or more subscriptions from a distributor record to another distributor record. When customer 120 wants to transfer a subscription from a first distributor record to a second distributor record, customer 120 may request that the assignment of the subscription to the first distributor record be transferred to the second distributor record.

Customer 120 may send a request to assign a subscription to distributor record 106 to customer portal 102. Customer portal 102 may receive the request to assign the subscription to distributor record 106. The subscription may be subject to a licensing agreement. Customer portal 102 includes a license enforcer 108. In an embodiment, license enforcer 108 determines, based on the set of capabilities of downstream server 110, whether downstream server 110 has the capability to enforce the licensing agreement. License enforcer 108 may determine whether downstream server 110 has the capability to enforce the licensing agreement in response to various events. License enforcer 108 may make this determination when, for example, customer portal 102 receives the request to assign the subscription to distributor record 106, customer portal 102 receives the set of capabilities (or updated set of capabilities as discussed below), and/or after a time period has elapsed.

In an example, set of registered entities 150 consumes the subscription, and license enforcer 108 determines downstream server 110 has the capability to enforce the licensing agreement by determining whether downstream server 110 has the capability to enforce the licensing agreement on set of registered entities 150. Accordingly, the company offering the product subscription may ensure that customer 120 is running a server that is capable of enforcing any licensing agreement to which a subscription consumed by a registered entity is subject.

When downstream server 110 is determined to have the capability to enforce the licensing agreement, license enforcer 108 assigns the subscription to distributor record 106. In contrast, when downstream server 110 is determined to not have the capability to enforce the licensing agreement, license enforcer 108 sends a message to customer 120, where the message indicates that the subscription has not been assigned to distributor record 106. The message may also indicate to customer 120 that an upgrade of downstream server 110 is required.

In an example, downstream server 110 has a first set of capabilities, and the subscription is subject to a licensing agreement that specifies a second set of capabilities. License enforcer 108 may determine whether downstream server 110 has the capability to enforce the licensing agreement by, for example, determining whether the second set of capabilities is included in the first set of capabilities of downstream server 110. When the second set of capabilities is included in the first set of capabilities of the downstream server 110, license enforcer 108 may determine that downstream server 110 has the capability to enforce the licensing agreement. When the second set of capabilities is not included in the first set of capabilities of downstream server 110, license enforcer 108 may determine that downstream server 110 does not have the capability to enforce the licensing agreement.

In the example illustrated in Table B, customer 120 sends a request to assign subscription "S1" to distributor record 106, where subscription "S1" is subject to licensing agreements A and B. License enforcer 108 may receive this request and determine, based on downstream server 110's set of capabilities A, B, and C, whether downstream server 110 has the capability to enforce licensing agreements A and B. Subscription "S1" is subject to licensing agreements A and B, and downstream server 110 at least has capabilities A and B, which indicate that downstream server 110 has the capability to enforce licensing agreements A and B. License enforcer 108 determines that downstream server 110 has the capability to enforce licensing agreements A and B, and assigns subscription "S1" to distributor record 106. Accordingly, downstream server 110 manages subscription "S1" and provides this subscription to, for example, set of registered entities 150. If an entity of set of registered entities 150 does not comply with licensing agreement A or B, downstream server 110 may restrict the entity from accessing subscription "S1".

C. Update Capabilities of the Downstream Server

Figure 2:
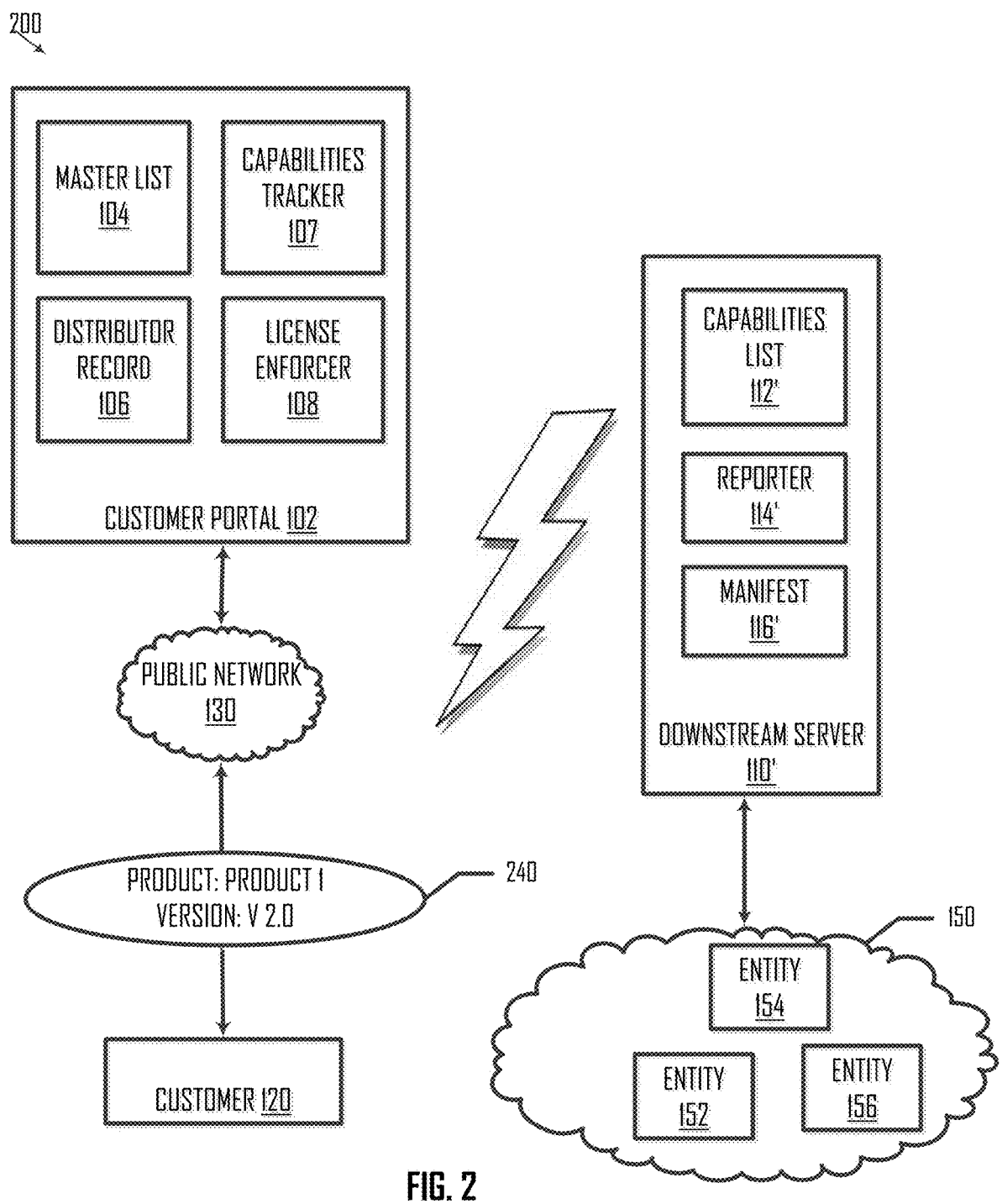
FIG. 2 is a block diagram illustrating capabilities of a downstream server being updated, according to an embodiment.

Customer 120 may desire to change downstream server 110 and use a different server than the product or version of downstream server 110 to manage customer 120's subscriptions. FIG. 2 is a block diagram 200 illustrating capabilities of downstream server 110 being updated, according to an embodiment. FIG. 2 includes customer portal 102 and customer 120 coupled over network 130.

When downstream server 110 is not connected to public network 130 or is unable to communicate with customer portal 102 by itself, customer 120 may manually adjust the product and version values of downstream server 110 (e.g., via customer portal 102). Downstream server 110' is the updated downstream server having a version "V 2.0" of server product "Product 1". In an example, customer 120 updates the downstream server by manually selecting the version and server product of the downstream server from master list 104. In such an example, customer 120 may select version "V 2.0" of server product "Product 1". In another example, customer 120 updates the downstream server by sending a request to update distributor record 106 to the version and server product specified in data 240. Data 240 specifies version "V 2.0" of server product "Product 1". In the example illustrated in FIG. 2, the updated downstream server is downstream server 110', which includes capabilities list 112', reporter 114', and manifest 116'.

In an example, customer 120 may want to upgrade downstream server 110 to version "V 2.0" of the server product "Product 1". In such an example, customer 120 may install software that upgrades downstream server 110 to downstream server 110'. In another example, customer 120 may want to downgrade downstream server 110 because, for example, the downgraded downstream server is cheaper to manage. When customer 120 changes the downstream server that manages customer 120's subscriptions, the capabilities of the downstream server may be changed. The updated server (e.g., upgraded or downgraded server) may be incapable of correctly enforcing system requirements for use of the subscriptions. In such a scenario in which customer 120 changes the downstream server that manages customer 120's subscriptions, it may be desirable to update the capabilities of the downstream server 110 and check whether the updated downstream server is capable of enforce any licensing agreements to which the subscription is subject.

Capabilities tracker 107 identifies the set of capabilities of the product and version of the updated downstream server 110' in master list 104 (e.g., specified in data 240 or selected by customer 120 from master list 104). In an example, capabilities tracker 107 receives a user selection of a downstream server having a version and server product specified in master list 104, where it includes the set of capabilities of the user selected downstream server. Receiving the set of capabilities of the downstream server may include identifying the set of capabilities of the user selected downstream server version from master list 104.

Capabilities tracker 107 receives the set of capabilities of downstream server 110 by, for example, identifying the set of capabilities of downstream server 110' in master list 104. Downstream server 110' corresponds to the second row in the example master list in Table A, which specifies version "V 2.0" of the server product "Product 1" having the capabilities of A, B, C, and D. The set of capabilities A, B, C, and D in row two of Table A may be used as the updated set of capabilities of downstream server 110', and capabilities tracker 107 updates distributor record 106 to reflect the updated set of capabilities of downstream server 110'.

In an example, before customer 120 updates downstream server 110, distributor record 106 includes the set of capabilities A, B, and C of downstream server 110 (see Table A). After customer 120 updates downstream server 110 to downstream server 110', capabilities tracker 107 updates distributor record 106 to include the set of capabilities A, B, C, and D (see Table A). Additionally, capabilities tracker 107 may update the set of entities that are registered with downstream server 110 to be registered with downstream server 110'.

The updated downstream server may manage a subscription and be unable to correctly enforce a licensing agreement to which the subscription is subject, thus putting some customers in violation of their subscriptions. It may be desirable to ensure that the updated downstream server with the set of its updated capabilities is capable of enforcing any licensing agreements to which the subscription is subject. In an example, when customer portal 102 receives a request to assign a subscription to a distributor record, license enforcer 108 determines, based on the set of capabilities of the downstream server that manages the subscription, whether the downstream server has the capability to enforce a licensing agreement to which the subscription is subject. License enforcer 108 may determine, based on the updated set of capabilities (e.g., capabilities of downstream server 110') stored in distributor record 106, whether downstream server 110' has the capability to enforce the licensing agreement to which the subscription is subject. When downstream server 110' is determined to have the capability to enforce the licensing agreement, license enforcer 108 assigns the subscription to distributor record 106. In contrast, when downstream server 110' is determined to not have the capability to enforce the licensing agreement, license enforcer 108 does not assign the subscription to distributor record 106. License enforcer 108 may send a message indicating that the subscription has not been assigned to distributor record 106 to customer 120. The message may also indicate to customer 120 that an upgrade of the downstream server is required.

An advantage of an embodiment may enable the company providing the subscription to roll out new subscriptions with new requirements for how the subscriptions can be used (e.g., licensing agreements) without confusing customer 120 or letting customer 120 distribute subscriptions to their systems in a manner that is inconsistent with their licensing agreements.

Although the examples illustrated in FIGS. 1 and 2 illustrate the downstream server as not being coupled to public network 130, this is not intended to be limiting.

Figure 3:
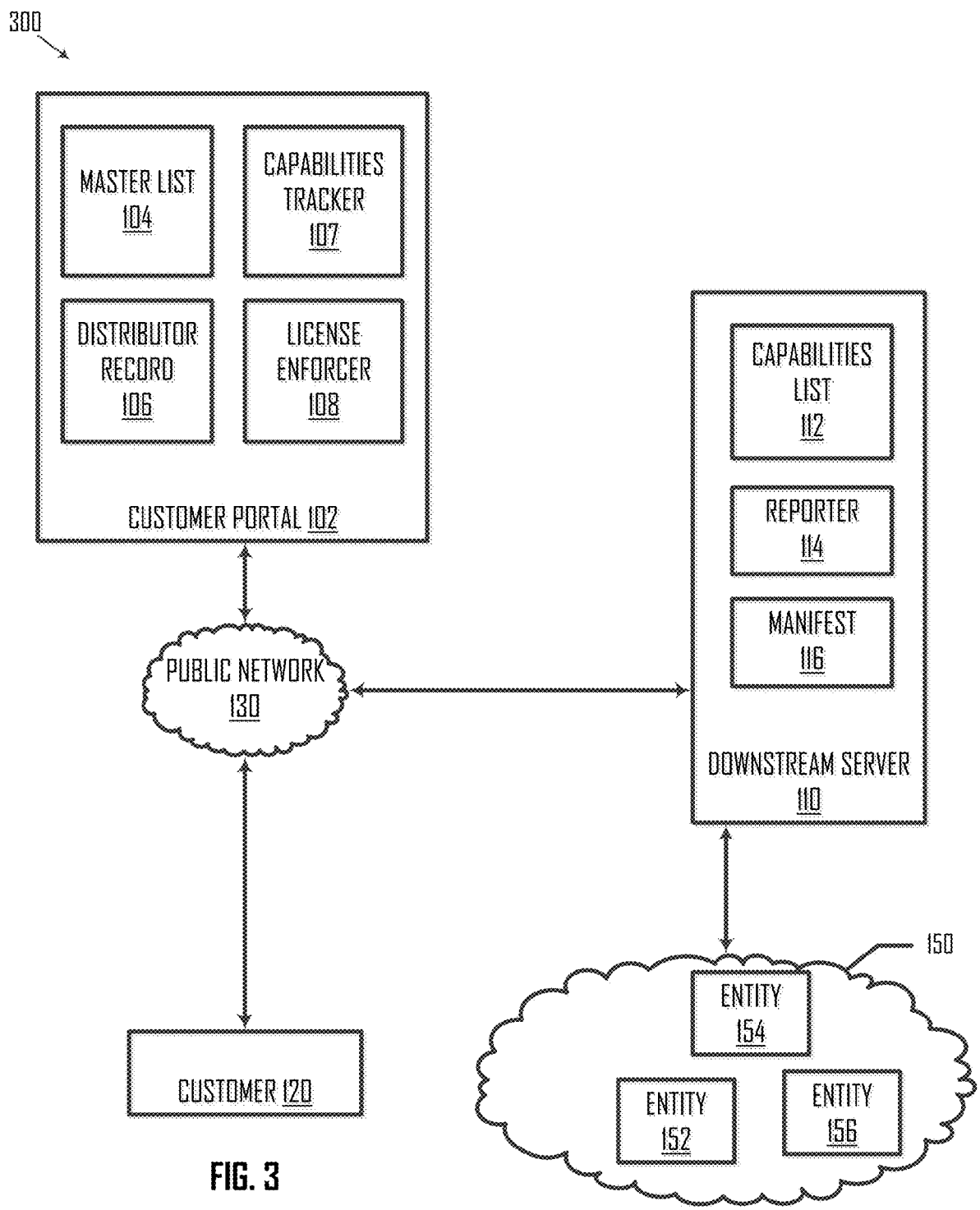
FIG. 3 is a block diagram illustrating a system for controlling access to a subscription, according to an embodiment.

II. Example System Architecture of Downstream Server Connected to a Public Network FIG. 3 is a block diagram 300 illustrating a system for controlling access to a subscription, according to an embodiment. FIG. 3 includes customer portal 102, customer 120, and downstream server 110 coupled over public network 130. Although downstream server 110 is coupled to public network 130, downstream server 110 may be unable to send requests to customer portal 102. Additionally, customer portal 102 may be unable to send messages to downstream server 110. Downstream server 110 may be behind a firewall, and customer portal 102 may be unable to pass messages through the firewall.

In FIG. 3, downstream server 110 includes capabilities list 112, reporter 114, and manifest 116. Downstream server 110 may be aware of its capabilities, and capabilities list 112 may include the subscriptions that downstream server 110 manages and the set of its capabilities. In an embodiment, reporter 114 reports its capabilities upstream to customer portal 102. In an example, reporter 114 sends a set of capabilities listed in capabilities list 112 to customer portal 102. The set of capabilities included in capabilities list 112 is the set of capabilities of downstream server 110.

Capabilities tracker 107 receives the set of capabilities from reporter 114 and stores the set of capabilities in distributor record 106. Reporter 114 may directly communicate with customer portal 102 and send customer portal 102 a web request that includes the set of capabilities listed in capabilities list 112. Although reporter 114 is illustrated as being included in downstream server 110, this is not intended to be limiting. For example, reporter 114 may execute on a computing device different from downstream server 110. In such an example, reporter 114 may send a request to downstream server 110 to obtain its set of capabilities and pass this information along to customer portal 102.

In an example, capabilities list 112 is hardcoded into downstream server 110. In such an example, when downstream server 110 has a new capability, it is added to the server code executing in downstream server 110. In another example, capabilities list 112 is not hardcoded into downstream server 110 and dynamically changes based on lost or new capabilities of downstream server 110. In such an example, reporter 114 may dynamically figure out when the capabilities of downstream server 110 have changed and report the updated capabilities to customer portal 102. In an example, the set of capabilities of a downstream server may change if the actual server software is updated. In such an example, from the perspective of customer portal 102, the set of capabilities changes depending on software upgrades.

Reporter 114 may periodically report its capabilities to customer portal 102. In an example, reporter 114 reports downstream server 110's capabilities after an amount of time has elapsed (e.g., one day or twelve hours). Capabilities tracker 107 receives the updated set of capabilities and synchronizes distributor record 106 with the updated set of capabilities of downstream server 110. In an example, capabilities tracker 107 updates distributor record 106 such that it includes the updated set of capabilities. Accordingly, distributor record 106, which corresponds to downstream server 110, is kept up-to-date about downstream server 110's capabilities.

Customer 120 may send a request to assign a subscription to distributor record 106, and license enforcer 108 may receive the request. In an example, the subscription is subject to a licensing agreement. License enforcer 108 determines, based on the set of capabilities of the downstream server that manages the subscription, whether the downstream server has the capability to enforce the licensing agreement. The set of capabilities of the downstream server that manages the subscription is the downstream server's updated set of capabilities. When the downstream server is determined to have the capability to enforce the licensing agreement, license enforcer 108 assigns the subscription to distributor record 106. When the downstream server is determined to not have the capability to enforce the licensing agreement, license enforcer 108 sends a message indicating that the subscription has not been assigned to the distributor record to customer 120. The message may also indicate that an upgrade of the downstream server is required.

As discussed above and further emphasized here, FIGS. 1-3 are merely examples, which should not unduly limit the scope of the claims. For example, it should be understood that although one downstream server is illustrated, other embodiments including more than one downstream server are within the scope of the present disclosure. Additionally, although downstream server 110 is described as being a subscription server, this is not intended to be limiting and downstream server 110 may be any type of server that may benefit from the teachings in the disclosure.

III. Example Method

Figure 4:
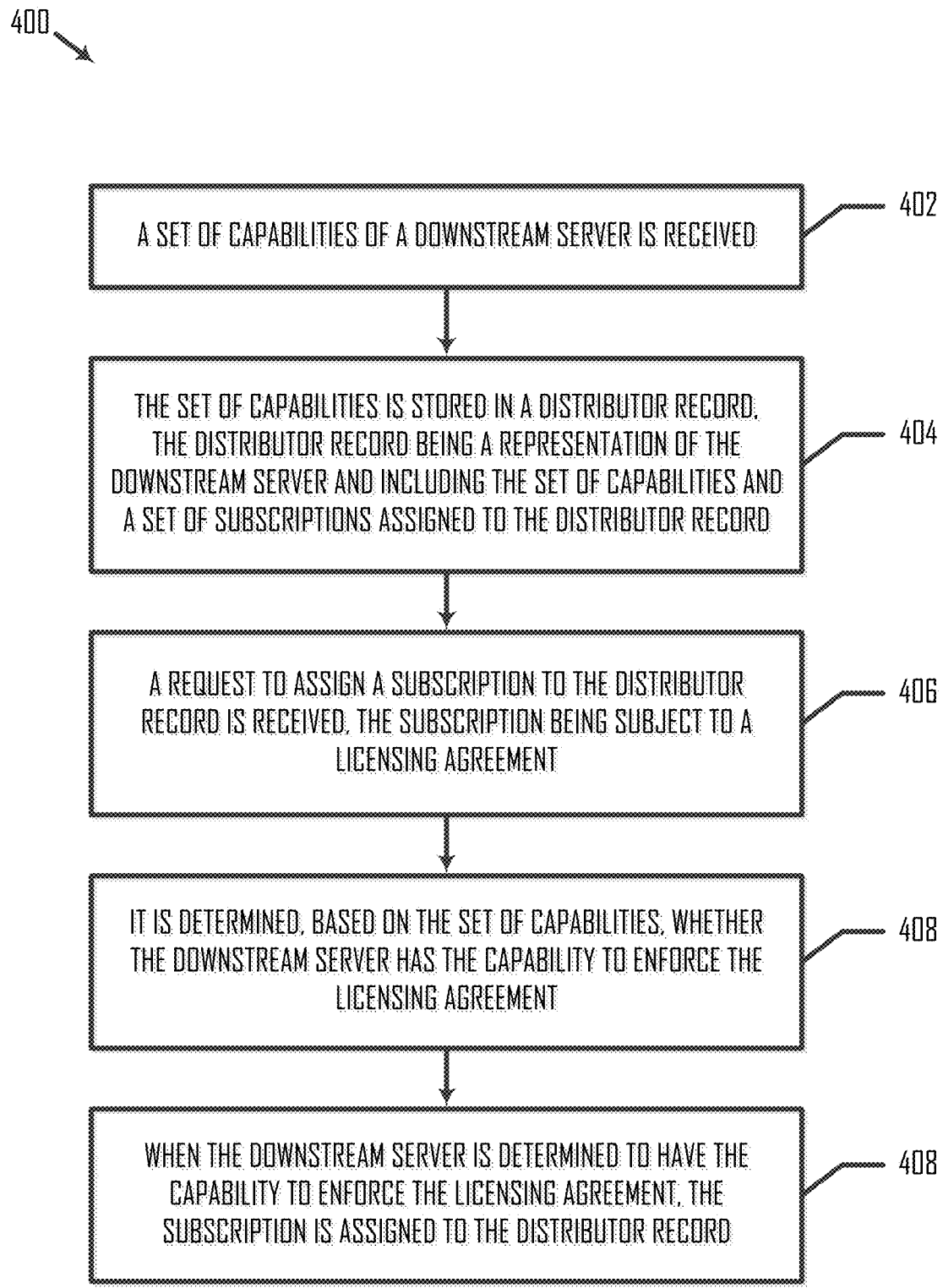
FIG. 4 is a flowchart illustrating a method of controlling access to a subscription, according to an embodiment.

FIG. 4 is a flowchart illustrating a method 400 of controlling access to a subscription, according to an embodiment. Method 400 is not meant to be limiting and may be used in other applications.

In FIG. 4, method 400 includes blocks 402-410. In a block 402, a set of capabilities of a downstream server is received. In an example, capabilities tracker 107 receives a set of capabilities of downstream server 110. Capabilities tracker 107 may receive the set of capabilities by, for example, identifying the set of capabilities corresponding to the downstream server in master list 104 or receiving the set of capabilities from reporter 114.

In a block 404, the set of capabilities is stored in a distributor record, the distributor record being a representation of the downstream server and including the set of capabilities and a set of subscriptions assigned to the distributor record. In an example, capabilities tracker 107 stores the set of capabilities in distributor record 106, which is a representation of downstream server 110 and includes the set of capabilities and a set of subscriptions assigned to distributor record 106.

In a block 406, a request to assign a subscription to the distributor record is received, the subscription being subject to a licensing agreement. In an example, license enforcer 108 receives a request to assign a subscription to distributor record 106, the subscription being subject to a licensing agreement. In a block 408, it is determined, based on the set of capabilities, whether the downstream server has the capability to enforce the licensing agreement. In an example, license enforcer 108 determines, based on the set of capabilities, whether downstream server 110 has the capability to enforce the licensing agreement. In a block 410, when the downstream server is determined to have the capability to enforce the licensing agreement, the subscription is assigned to the distributor record. In an example, when downstream server 110 is determined to have the capability to enforce the licensing agreement, license enforcer 108 assigns the subscription to distributor record 106.

It is also understood that additional processes may be inserted before, during, or after blocks 402-410 discussed above. It is also understood that one or more of the blocks of method 400 described herein may be omitted, combined, or performed in a different sequence as desired.

IV. Example Computing System

Figure 5:
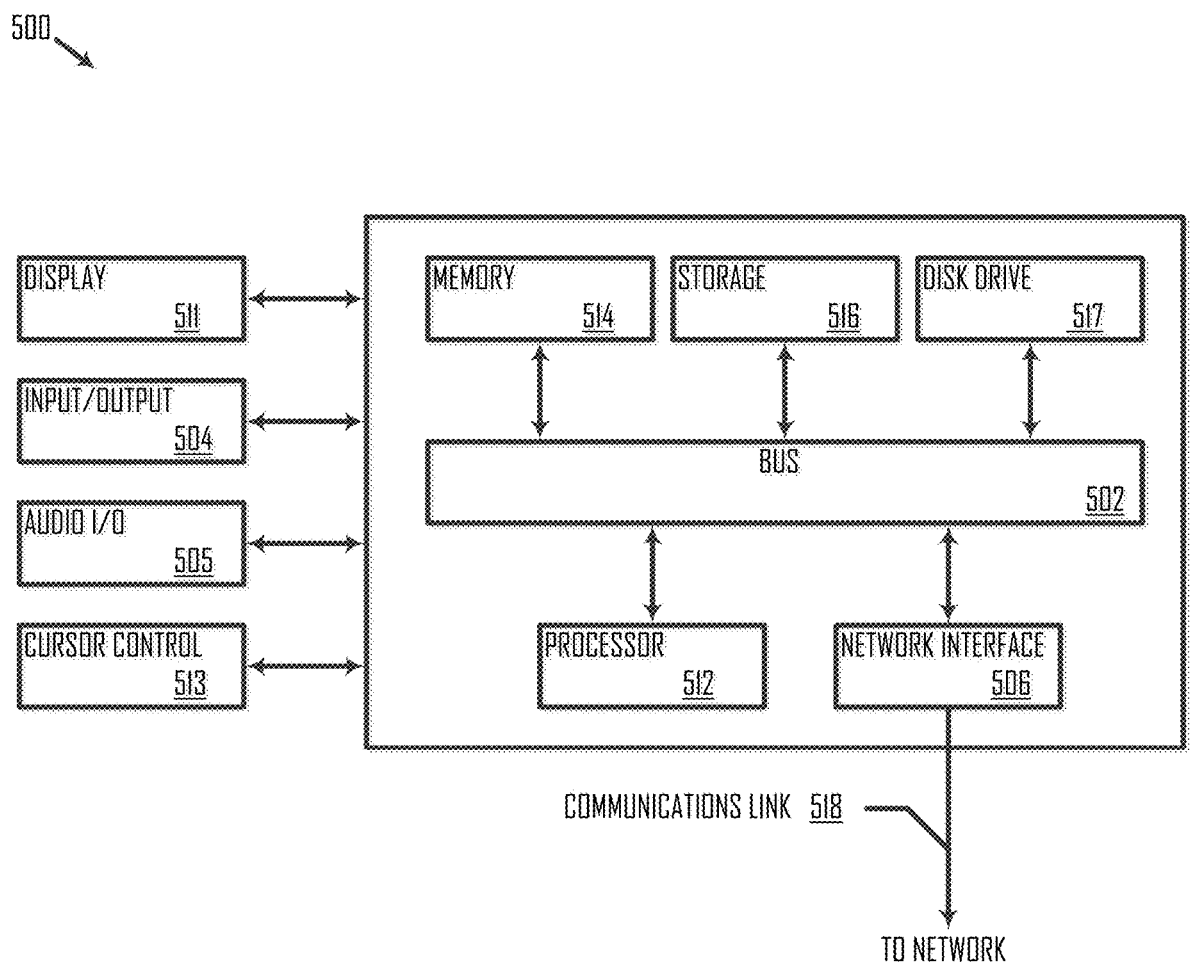
FIG. 5 is a block diagram of an electronic system suitable for implementing one or more embodiments of the present disclosure.

FIG. 5 is a block diagram of a computer system 500 suitable for implementing one or more embodiments of the present disclosure. In various implementations, computing device 102 may include a client or a server computing device that includes one or more processors and may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component such as a display 511, and an input control such as a cursor control 513 (such as a keyboard, keypad, mouse, etc.). An optional audio input/output component 505 may also be included to allow a user to use voice for inputting information by converting audio signals into information signals. Audio I/O component 505 may allow the user to hear audio. A transceiver or network interface 506 transmits and receives signals between computer system 500 and other devices via a communication link 518 to a network. In an embodiment, the transmission is wireless, although other transmission mediums and methods may also be suitable. A processor 512, which may be a micro-controller, digital signal processor (DSP), or other processing component, processes these various signals, such as for display on computer system 500 or transmission to other devices via communication link 518. Processor 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 514, and transmission media includes coaxial cables, copper wire, and fiber optics, including wires that include bus 502. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 400) to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various action described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of controlling access to a subscription, the method comprising:
receiving, by a computing system associated with a customer portal, a request to subscribe to a product, a subscription to the product being subject to a set of restrictions agreed to by an entity that accesses the subscription, and at least one restriction of the set of restrictions limiting a number of central processing unit (CPU) cores that an entity may use when accessing the subscription;

maintaining, by the computing system, a list of downstream server product types and versions, wherein the list includes one or more capabilities of each of the listed downstream server product types and versions;

storing, by the computing system, a distributor record, the distributor record being a representation of the current capabilities of a downstream server, wherein the distributor record includes a first set of capabilities, wherein the distributor record further includes a version and a product type of the downstream server;

determining, by the computing system, based on the first set of capabilities, whether the downstream server has a capability to enforce the set of restrictions on a set of entities, the set of restrictions including a limit of a number of CPU cores that the set of entities may use when accessing the subscription;

in response to a determination that the downstream server has the capability to enforce the set of restrictions on the set of entities, assigning, by the computing system, the subscription to the downstream server, wherein the assigning enables the downstream server to control access to the subscription, wherein controlling access to the subscription comprises at least one of Providing access or restricting access to the subscription;

in response to the assigning of the subscription to the downstream server, providing, by the downstream server, the set of entities with access to the subscription;

in response to a determination that the downstream server does not have the capability to enforce the set of restrictions on the set of entities, the computing device does not assign the subscription to the downstream server, and access to the subscription is not provided by the downstream server to the set of entities;

periodically executing, by the downstream server, a reporter of the downstream server, wherein the executing identifies a change to the capabilities of the downstream server and sends a report of the change to the computing system; and updating, by the computing system, the list, in response to receiving the report from the downstream server.

2. The method of claim 1, the method further comprising: in response to a determination that the downstream server does not have the capability to enforce the set of restrictions on the set of entities, sending, by the computing system, a message indicating that the subscription has not been assigned to the distributor record, wherein if the subscription is not assigned to the distributor record, the downstream server does not manage the subscription.

3. The method of claim 1, the method further comprising: in response to a determination that the downstream server does not have the capability to enforce the set of restrictions on the set of entities, sending, by the computing system, a message indicating that an upgrade of the downstream server is required.

4. The method of claim 1, wherein the first set of capabilities includes a capability of enforcing the number of CPU cores that the entity uses while accessing the subscription.

5. A system for controlling access to a subscription, the system comprising:
an upstream server computer,
and a downstream server computer;
wherein the upstream server computer is configured to perform the functions of:
receiving a request to subscribe to a product, a subscription to the product being subject to a set of restrictions agreed to by an entity that accesses the subscription, and at least one restriction of the set of restrictions limiting an amount of random access memory (RAM) that an entity registered with a downstream server may use when accessing the subscription;

maintaining a list of downstream server product types and versions, wherein the list includes one or more capabilities of each of the listed downstream server product types and versions;

storing a distributor record, the distributor record being a representation of the current capabilities of the downstream server, wherein the distributor record includes a first set of capabilities, wherein the distributor record further includes a version and a product type of the downstream server;

updating the list, in response receiving a report from a downstream server;

determining, based on the first set of capabilities, whether the downstream server has a capability to enforce the set of restrictions on a set of entities, the set of restrictions including a limit of a number of CPU cores that the set of entities may use when accessing the subscription;

in response to a determination that the downstream server has the capability to enforce the set of restrictions on the set of entities, assigning the subscription to the downstream server, wherein the assigning enables the downstream server to control access to the subscription, wherein controlling access to the subscription comprises at least one of providing access or restricting access to the subscription; and in response to a determination that the downstream server does not have the capability to enforce the set of restrictions on the set of entities, does not assign the subscription to the downstream server;

wherein the downstream server computer is configured to perform the functions of:
in response to the assigning of the subscription to the downstream server, providing the set of entities with access to the subscription; and periodically executing a reporter of the downstream server, wherein the executing identifies a change to the capabilities of the downstream server, and sends a report of the change to the upstream server.

6. The system of claim 5, wherein the downstream server is behind a firewall.

7. The system of claim 5, wherein the downstream server is connected to a public network, and wherein the upstream server is further configured to perform the functions of:
periodically sending capabilities reports to the upstream server a over the public network.

8. The system of claim 7, wherein the downstream server does not send requests to the upstream server.

9. The system of claim 8, wherein the downstream server is not connected to the public network.

10. A non-transitory machine-readable medium comprising a plurality of machine-readable instructions that when executed by one or more processors is adapted to cause the one or more processors to perform a method comprising:
receiving, by an upstream server associated with a customer portal, a request to subscribe to a product, a subscription to the product being subject to a set of restrictions agreed to by an entity that accesses the subscription, and at least one restriction of the set of restrictions limiting a number of central processing unit (CPU) cores that an entity may use when accessing the subscription;

maintaining, by the upstream server, a list of downstream server product types and versions, wherein the list includes one or more capabilities of each of the listed downstream server product types and versions;

storing, by the upstream server, a distributor record, the distributor record being a representation of the current capabilities of a downstream server, wherein the distributor record includes a first set of capabilities, wherein the distributor record further includes a version and a product type of the downstream server;

determining, by the upstream server, based on the first set of capabilities, whether the downstream server has a capability to enforce a limit of a number of CPU cores that the set of entities may use when accessing the subscription;

in response to a determination that the downstream server has the capability to enforce the set of restrictions on the set of entities, assigning, by the upstream server, the subscription to the downstream server, wherein the assigning enables the downstream server to control access to the subscription, wherein controlling access to the subscription comprises at least one of providing access or restricting access to the subscription;

in response to the assigning of the subscription to the downstream server, providing, by the downstream server, the set of entities with access to the subscription;

in response to a determination that the downstream server does not have the capability to enforce the set of restrictions on the set of entities, the upstream server does not assign the subscription to the downstream server, and access to the subscription is not provided by the downstream server to the set of entities.

11. The method of claim 1, wherein the first set of capabilities includes a capability of enforcing a limitation on an amount of random access memory (RAM) that the entity uses while accessing the subscription.

12. The method of claim 1, wherein the downstream server associated with the first set of capabilities has the capability to enforce the set of restrictions on the set of entities, the method further comprising:
in response to the updating of the list, replacing the first set of capabilities stored in the distributor record with a second set of capabilities, based on the updated list;
determining, based on the second set of capabilities, that the downstream server does not have the capability to enforce the set of restrictions on the set of entities;
and in response to a determination that the downstream server having the second set of capabilities does not have the capability to enforce the set of restrictions on the set of entities, the computing device does not assign the subscription to the downstream server, and access to the subscription is not provided by the downstream server.

13. The method of claim 1, wherein the downstream server associated with the first set of capabilities does not have the capability to enforce the set of restrictions on the set of entities, the method further including: in response the updating of the list, replacing the first set of capabilities stored in the distributor record with a second set of capabilities, based on the updated list; determining, based on the second set of capabilities, that the downstream server has the capability to enforce the set of restrictions on the set of entities; and in response to a determination that the downstream server having the second set of capabilities has the capability to enforce the set of restrictions on the set of entities, assigning, by the computing system, the subscription to the downstream server.

14. The system of claim 5, the functions of the upstream server further comprising:
wherein receiving the report from the downstream server includes receiving a second set of capabilities and a second version and a second product type of the downstream server;
updating the distributor record by replacing the first set of capabilities stored in the distributor record with the second set of capabilities, wherein the downstream server associated with the first set of capabilities has the capability to enforce the set of restrictions on the set of entities;
determining, based on the second set of capabilities, that the downstream server does not have the capability to enforce the set of restrictions on the set of entities; and
in response to a determination that the downstream server having the second set of capabilities does not have the capability to enforce the set of restrictions on the set of entities, the upstream server does not assign the subscription to the downstream server, and access to the subscription is not provided by the downstream server to the set of entities.

15. The system of claim 5, the functions of the upstream server further comprising:
wherein receiving the report from the downstream server includes receiving a second set of capabilities of the downstream server;
updating the distributor record by replacing the first set of capabilities stored in the distributor record with the second set of capabilities, wherein the downstream server associated with the first set of capabilities does not have the capability to enforce the set of restrictions on the set of entities;
determining, based on the second set of capabilities, that the downstream server has the capability to enforce the set of restrictions on the set of entities; and
in response to a determination that the downstream server having the second set of capabilities has the capability to enforce the set of restrictions on the set of entities, assigning the subscription to the downstream server, wherein the assigning enables the downstream server to control access to the subscription.

16. The method of claim 1, wherein a third restriction of the set of restrictions limits an amount of RAM that the entity may use when accessing the subscription.

17. The non-transitory machine-readable medium of claim 10, wherein the first set of capabilities includes a capability of enforcing a limitation on an amount of RAM that the entity uses while accessing the subscription.

* * * * *